United States Patent [19]

Gallup et al.

[11] Patent Number: 5,085,782
[45] Date of Patent: Feb. 4, 1992

[54] PROCESS FOR CONTROLLING THE PH OF A BRINE

[75] Inventors: Darrell L. Gallup, Chino; Manuel E. Obando, Whittier, both of Calif.

[73] Assignee: Union Oil Company of California, Los Angeles, Calif.

[21] Appl. No.: 635,478

[22] Filed: Dec. 28, 1990

[51] Int. Cl.$^5$ .................... C02F 5/02; B01D 53/34
[52] U.S. Cl. .................... 210/696; 210/712; 210/718; 210/743; 210/747; 210/750; 210/755; 210/758; 55/73; 423/224; 423/226
[58] Field of Search ............ 55/43, 68, 69, 73; 210/696, 712, 717, 718, 721, 737, 743, 747, 750, 755, 758, 766; 423/220, 224, 226-228

[56] References Cited

U.S. PATENT DOCUMENTS

| | | | |
|---|---|---|---|
| 4,123,506 | 10/1978 | Spevack | 55/73 |
| 4,218,431 | 8/1980 | Spevack | 210/712 |
| 4,224,151 | 9/1980 | Jost | 210/696 |
| 4,319,895 | 3/1982 | Kemmer | 55/73 |
| 4,410,432 | 10/1983 | Domahidy | 210/750 |
| 4,500,434 | 2/1985 | Jost et al. | 210/696 |
| 4,522,728 | 6/1985 | Gallup et al. | 210/718 |
| 4,844,162 | 7/1989 | Maassen et al. | 55/73 |
| 4,909,945 | 3/1990 | Delaney | 210/712 |
| 4,978,457 | 12/1990 | Gallup et al. | 210/747 |
| 5,032,284 | 7/1991 | Gallup et al. | 210/747 |

*Primary Examiner*—Thomas Wyse
*Attorney, Agent, or Firm*—Gregory F. Wirzbicki; Clark E. DeLarvin

[57] ABSTRACT

In the processing of a geothermal brine and the recovery of heat therefrom, there are produced a non-condensable gas stream containing hydrogen sulfide and carbon dioxide and a liquid stream comprising a condensate of steam derived from the brine. In accordance with the present invention, the noncondensable gases are introduced into the condensate in the presence of an oxidizing agent to form a gas-liquid mixture. The mixture is maintained at an alkaline pH for a time sufficient for a substantial portion of the hydrogen sulfide to be oxidized. Thereafter, the mixture is introduced into a gas-liquid separation zone for separate recovery of a gas stream comprising a major amount of carbon dioxide and substantially free of hydrogen sulfide. Advantageously, the recovered gas stream is recycled to the geothermal brine process to reduce the pH of the brine and its scaling potential.

23 Claims, No Drawings

PROCESS FOR CONTROLLING THE PH OF A BRINE

FIELD OF THE INVENTION

The present invention broadly relates to the processing of a geothermal brine. It particularly relates to a process for recovering carbon dioxide from a geothermal brine, for use in pH control of the brine to reduce scaling.

BACKGROUND DISCUSSION

General processes by which geothermal fluids can be used to generate electric power are known and have been known for some time. Naturally pressurized geothermal brine having a temperature of over about 400° F. can be flashed to a reduced pressure to convert some of the brine or water to steam. The steam produced in this manner can then be used to drive steam turbine generators. The flashed geothermal liquid and the steam condensate obtained from power generation are typically reinjected into the ground to replenish the aquifer and prevent ground subsidence.

Although, as above mentioned, general processes are known for using geothermal brine or water for production of electric power, serious problems, especially with the use of highly saline geothermal brine, have often been encountered in practice. These problems have frequently been so great as to prevent the production of electric power at competitive rates and, as a consequence, have greatly impeded the progress of flashed geothermal brine power plant development in many areas.

These severe problems are caused primarily by the complex composition of geothermal brines. At natural aquifer temperatures in excess of about 400° F. and pressures in the typical range of from 400 to 500 psig, the brine leaches large amounts of salts, minerals and elements from the aquifer formation. Thus, although brine composition may vary from aquifer to aquifer, wellhead brine typically contains very high levels of dissolved silica, as well as substantial levels of dissolved heavy metals such as lead, copper, zinc, iron and cadmium. In addition, many other impurities, particulate matter and dissolved gases are present in most geothermal brines.

As the natural brine pressure and temperature are substantially reduced in power plant steam production (flashing) stages, chemical equilibrium of the brine is disturbed and saturation levels of impurities in the brine are typically exceeded. This causes impurities and silica to precipitate from the brine, as a tough scale, onto surrounding equipment walls and in reinjection wells, often at a rate of several inches in thickness per month. Assuming, as is common, that the brine is supersaturated with silica at the wellhead, in high temperature portions of the brine handling system, for example, in the high pressure brine flashing vessels, heavy metal sulfide and silicate scaling typically predominates. In lower temperature portions of the system, for example, in atmospheric flashing vessels, amorphous silica and hydrated ferric oxide scaling has been found to predominate. Scale, so formed, typically comprises iron-rich silicates, and is usually very difficult, costly and time consuming to remove from equipment. Because of the fast growing scale rates, extensive facility down time for descaling operations may be required, unless scale reducing processes are used. Associated injection wells may also require frequent and extensive rework and new injection wells may, from time to time, have to be drilled at great cost.

Therefore, considerable effort has been, and is being, directed towards developing effective processes for eliminating, or at least very substantially reducing, silica scaling in flashed geothermal brine handling systems. One such scale reduction process comprises controlling the pH of the brine and/or a condensate of steam derived from the brine. The pH control generally involves adding acid to the brine or condensate to achieve a pH reduction. It has also been suggested to add acid to a geothermal brine at various points during its processing to reduce scale formation. An obvious disadvantage of these processes is the necessity of purchasing the required acid.

SUMMARY OF THE INVENTION

The present invention provides an effective and economical process for controlling the emission of hydrogen sulfide and the recovery of substantially pure carbon dioxide from a system in which a geothermal brine is processed. The invention also provides a process for controlling the pH and reducing the scale-forming potential of the geothermal brine, and liquids derived therefrom, during its processing. The invention is particularly directed to a geothermal brine processing system in which a condensate of steam derived from the brine is circulated through a cooling tower, and noncondensable gases, principally comprising $CO_2$ and hydrogen sulfide, are produced.

In accordance with the present invention, a noncondensable gas containing $CO_2$ and $H_2S$ derived from geothermal brine is introduced into a condensate of steam also derived from the geothermal brine to form a mixture. The mixture is maintained at a pH from about 7 to 8 in the presence of an oxidizing agent for a time sufficient to oxidize in excess of 90 percent of the sulfide to a sulfate. The mixture is then introduced into a gas-liquid separation zone from which there is withdrawn a $CO_2$-containing gas substantially free of $H_2S$ and a condensate of steam containing dissolved sulfate therein. The $CO_2$-containing gas is separately recovered, and the condensate of steam is circulated through a cooling tower.

In accordance with a particular preferred embodiment, the $CO_2$-containing gas is introduced into the geothermal brine system to reduce the pH of the brine and its scale-forming potential whereby the requirements for purchased acid are substantially reduced.

DETAILED DESCRIPTION OF THE INVENTION

For convenience, the present invention will be described with respect to a particularly preferred application, namely, for a system in which a geothermal brine is used to generate electrical power. The brine typically contains significant quantities of oxidizable species including, among others, sulfides, sulfites, nitrites and their precursors. In such a system, brine from a geothermal well is first introduced into a zone of reduced pressure (flashed) to produce two phases, a gas phase and a liquid phase. The gas phase principally comprises steam along with a minor amount of non-condensable gases, both of which are passed through a steam turbine which drives a generator to produce electric power.

The effluent steam from the turbine is introduced into a condenser, in which at least some of the steam is condensed to form a condensate and from which the non-condensable gases, principally comprising carbon dioxide and a minor amount of hydrogen sulfide, are discharged. The condensate is circulated through at least one open cooling tower. Generally, the cooling tower will have associated therewith a condensate catch basin and a sump. Meanwhile, the liquid phase, referred to as the rejected brine, may be passed through one or more additional zones of reduced pressure to produce additional steam. Under ideal circumstances, the condensate and the rejected brine ultimately are combined for disposal by reinjection into a well.

For a more detailed description of geothermal brine processing and brine constituents, see, for example, METHOD FOR THE PRODUCTION OF USABLE STEAM AND NON-TOXIC SOLIDS FROM GEOTHERMAL BRINE, U.S. Pat. No. 4,763,479 issued Aug. 16, 1988 and assigned to the assignee of the present invention, which is incorporated herein by reference in its entirety.

In accordance with the present invention, the noncondensable gases are mixed with the condensate and a small amount of an oxidizing agent. Among the oxidizing agents suitable for use in the present invention are those having at least one

(haloimine) group wherein X is a halogen. Preferred agents have an

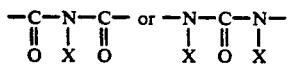

group and the even more preferred agents have a

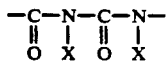

group, wherein in each instance X is the same or different halogen. The preferred halogens are chlorine and bromine. It will be noted that in the particularly preferred agents no two haloimine groups are bonded to one another.

Generally, the oxidizing agents are organic compounds containing the above-described haloimine or haloimine-carbonyl functionality and at least about 3, generally from about 3 to about 20, and preferably from 3 to about 15 atoms other than hydrogen, i.e., carbon, heteroatoms such as S, O, N, etc., and pendant functional groups, e.g., oxy, thioxy, amino, thiol groups and/or organic radicals.

The preferred oxidizing agents of the present invention are characterized by a heterocyclic ring structure comprising carbon and nitrogen atoms. Affixed to the ring structure is at least one and preferably two or more halogen atoms. Thus, the oxidizing agents of the present invention may be described as halogenated-organic oxidizing agents or more specifically, as halogenated-heterocyclic, organic oxidizing agents.

The most preferred oxidizing agent for use in accordance with the present invention comprises a ring structure and may be characterized by the following general formula:

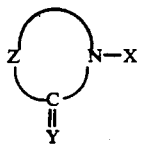

wherein X is a halogen, Y is oxygen or sulfur and Z is a divalent radical of from 3 to 10, preferably 3 to 8, more preferably 3 to 4 atoms in length, forming the ring structure. The ring structure preferably consists of alternate nitrogen and carbon atoms. Typical ring structures are triazine and oxidiazole. Typically, each nitrogen atom of the ring structure is substituted with a halogen. The carbon atoms are generally bonded to one or more members of the group consisting of hydrogen, oxygen, chlorine, bromine and $C_1$ to $C_6$ organic radicals. The organic radicals are preferably aliphatic radicals, more preferably substituted or unsubstituted alkyl radicals, and even more preferably unsubstituted alkyl radicals having 1 to 3 carbon atoms, with methyl being most preferred. The preferred halogens, based upon their availability, are chlorine and bromine.

A noteworthy aspect of the ring structures of the preferred oxidizing agents is that they include oxycarbonyls adjacent each side of at least one of the halogen-substituted nitrogen atoms. The preferred agents further include a halogen-substituted nitrogen atom adjacent each side of at least one of the oxycarbonyls. Two preferred agents have the following chemical structure:

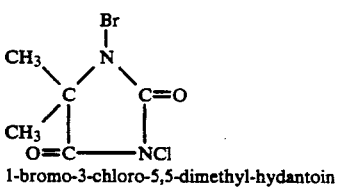

1-bromo-3-chloro-5,5-dimethyl-hydantoin

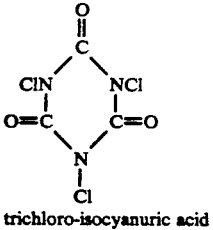

trichloro-isocyanuric acid

It is readily seen that these two structures fulfill the foregoing definitions with respect to the constituents of the ring structure, the preferred halogen, and location of oxycarbonyls relative to halogen substituted nitrogen.

The hydrogen sulfide in the noncondensable gases leaving the condensers has generally, heretofore, been emitted into the atmosphere. Depending upon the particular geothermal brine, power plant size and hydrogen sulfide content in the geothermal brine, the amount of the hydrogen sulfide emitted into the atmosphere with other gases from the condenser may presently, or in the near future, exceed hydrogen sulfide emission limits in some localities.

In the present invention, the non-condensable gases, containing $H_2S$, are not emitted to the atmosphere, but instead are introduced into a make-up water return conduit at a point well upstream of the cooling tower. In this conduit, there usually is contained condensate, $H_2S$, $NH_3$ and the oxidizing agent. Most of the hydrogen sulfide reacts with the ammonia in the condensate to form ammonium bisulfide, which is oxidized to bisulfate. This abates hydrogen sulfide emission from the noncondensable gases. Even if the sulfide precursor is present as a compound other than ammonium bisulfide, such compound also is oxidized to a sulfate, and $H_2S$ emissions are abated.

The oxidizing agent preferably is added to the condensate in a continuous, or substantially continuous manner. One way to accomplish this is to introduce a stream containing the agent (in a solid or liquid form) in a relatively small concentration into the condensate in a continuous, or at least a substantially continuous, manner. The oxidizing agent is introduced at a rate effective for substantially eliminating the emission of hydrogen sulfide. An alternative way to accomplish continuous, or substantially continuous, introduction is by periodically adding a slowly-dissolving pellet or pellets of solid oxidizing agent into the cooling tower or catch basin.

If the oxidizing agent were to oxidize all the sulfide and any nitrites in the steam condensate to a sulfate and nitrate, respectively, by direct chemical reaction, one would expect to need at least a stoichiometric amount of the oxidizing agent. For example, for trichloro-isocyanuric acid and hydantoin biocides, respectively, the stoichiometric amount would be in accordance with the following reactions:

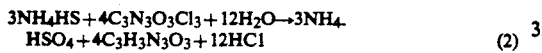

$$3NH_4HS + 4C_3N_3O_3Cl_3 + 12H_2O \rightarrow 3NH_4HSO_4 + 4C_3H_3N_3O_3 + 12HCl \quad (2)$$

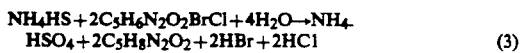

$$NH_4HS + 2C_5H_6N_2O_2BrCl + 4H_2O \rightarrow NH_4HSO_4 + 2C_5H_8N_2O_2 + 2HBr + 2HCl \quad (3)$$

with other acids such as hydrochloric and hydrobromic acids also being possibly formed. By similar reactions (not shown) the trichloro-isocyanuric acid and hydantoin biocides also would be expected to oxidize the ammonium bisulfite in the condensate to ammonium sulfate.

Since geothermal brines contain substantial quantities of oxidizable species such as arsenic, etc., one would normally expect that, if only direct oxidation reactions were responsible for the abatement of $H_2S$ and $NO_x$, one would need to add at least the stoichiometric amount of oxidant for conversion of all oxidizable species in order to ensure that substantially all the hydrogen sulfide was removed from the noncondensable gases.

However, as disclosed in co-pending U.S. Pat. Application No. 575,216 filed Aug. 30, 1990 which is incorporated by reference herein in its entirety, it has been found that far less than the stoichiometric amount for oxidizing all species is required to obtain excellent results. For example, for a Salton Sea geothermal brine, an effective amount was found to be within the range of from about 0.1 to about 0.5 percent of the theoretical stoichiometric amount required for oxidation of all oxidizable species present in the noncondensable gases and brine.

It also was discovered that the amount of oxidizing agent needed to reduce both hydrogen sulfide and nitrogen dioxide emissions by in excess of 70 percent, generally in excess of 80 percent, and preferably in excess of about 90 percent and more preferably in excess of about 95 percent, is only an extremely small percentage (for example, only about 0.05 to about 0.1 percent) of the stoichiometric amount of oxidizing agent for conversion of just the sulfides alone. In addition, these small amounts also concurrently convert arsenious acid to a less toxic, stable compound (as taught in co-pending U.S. Pat. Application No. 07/473,226 filed Jan. 31, 1990, now U.S. Pat. No. 5,024,769, and incorporated herein by reference in its entirety).

Apparently, the agent (possibly in conjunction with the small amounts of some materials, such as iron, carried over into the condensate from the geothermal brine) functions as a catalyst in the oxidation reactions.

The present inventors have found that the $H_2S$ removal is pH-sensitive. Normally, the condensate just prior to entering the cooling tower has a pH of about 9 or higher. However, when mixed with the noncondensable sulfide-containing gas, the pH drops to below about 7. At that lower pH, $H_2S$ removals frequently may be below 95 percent. In accordance with the present invention, an alkali material is added to increase the pH and maintain it within the range from about 7 to 8. Typical alkali materials are calcium or sodium oxides and carbonates. The preferred alkali material is calcium oxide based on its availability and cost.

The mixture of noncondensable gas (typically comprising about 97% carbon dioxide, 1.5% misc. gases and about 0.5% hydrogen sulfide), condensate and oxidizing agent is maintained within the pH range of about 7 to 8 for a time sufficient to achieve at least 95 and preferably in excess of 97 percent removal of hydrogen sulfide from the noncondensable gases. Typically, a time of from 2 to 60 seconds, and generally a time of from 5 to 30 seconds, is sufficient.

The temperature of the mixture is not particularly critical; however, it has been found that higher temperatures produce a faster reaction rate. Thus, if it is advantageous to reduce the required reaction time, temperatures in excess of ambient may be utilized.

Generally, it is preferred that the noncondensable gas be introduced into the condensate in an amount to provide a volume ratio of liquid to gas of at least 3:1, preferably at least 5.1, and more preferably in excess of about 10:. The higher volume ratios of liquid to gas further reduce the time required to achieve the desired $H_2S$ removal.

The mixture of condensate, oxidizing agent and noncondensable gas is then introduced into a gas-liquid separation zone which preferably is maintained under superatmospheric pressure to facilitate recovery of the noncondensable gas therefrom. Typically the separator is at a pressure of from 1 to 5 atmospheres and preferably from 1.5 to 2.5 atmospheres. The condensate and oxidizing agent are withdrawn and passed through a cooling tower.

The noncondensable gas, now substantially free of sulfide and typically consisting essentially of carbon dioxide is separately recovered. Typically the recovered gas will comprise in excess of 98 % carbon dioxide and generally in excess of 99% carbon dioxide by volume. This $CO_2$-containing gas may be used for any of a number of industrial purposes for which it has known application. In accordance with the present invention, it preferably is introduced into a geothermal brine system at selected or various points to reduce the pH of the brine and substantially reduce its scaling potential. This use substantially reduces the amount of acid which otherwise would have to be purchased to achieve the pH reduction.

There has been described above a preferred embodiment of the invention for recovering a substantially pure carbon dioxide gas from a geothermal brine handling system and the use of that gas for brine pH control for the purpose of illustration. It will be appreciated that the invention is not limited to this illustrative example. The invention may be used in any facility producing sulfide and carbon dioxide containing gas streams. Accordingly, many process modifications and variations may occur to those skilled in the art and still be within the scope of the invention as defined by the appended claims.

What is claimed is:

1. A process for recovering and using non-condensable gases produced during flashing of a geothermal brine, said gases comprising a major amount of carbon dioxide and a minor amount of hydrogen sulfide, said process comprising:
   a. introducing said noncondensable gases into a condensate of steam derived from the brine in the presence of an oxidizing agent to form a mixture,
   b. maintaining the mixture at a pH in excess of 7 for a time sufficient to oxidize substantially all of the hydrogen sulfide,
   c. introducing the mixture into a gas-liquid separation zone and recovering a carbon dioxide-containing gas substantially free of sulfide, and
   d. introducing the carbon dioxide-containing gas into a geothermal brine to lower the pH thereof.

2. The process of claim 1 wherein the mixture is maintained at a pH of from 7 to 8.

3. The process of claim 1 wherein the pH is controlled by adding an-alakali material to the mixture.

4. The process of claim 1 wherein the noncondensable gas is introduced into the condensate in an amount sufficient to provide a volume ratio of liquid to gas of at least 3:1.

5. The process of claim 1 wherein the oxidizing agent is selected from the group consisting of trichloro-isocyanuric acid and salts thereof, 1-bromo-3-chloro-5,5-dimethyl-hydantoin and other halogenated substituted hydantoins, and mixtures thereof.

6. The process of claim 1 wherein the oxidizing agent comprises trichloro-isocyanuric acid.

7. The process of claim 1 wherein the amount of the oxidizing agent present in the mixture is substantially less than the stoichiometric amount which would be needed to directly oxidize all the sulfide to a sulfate.

8. A process for reducing the amount of scale formed during processing of a geothermal brine in which process there is produced a condensate of steam derived from the brine and noncondensable gases comprising a major amount of carbon dioxide and a minor amount of $H_2S$ comprising:
   a. introducing the noncondensable gases into the condensate in the presence of an oxidizing agent to form a mixture,
   b. maintaining the mixture at a pH of at least about 7 for a time sufficient to oxidize substantially all of the hydrogen sulfide,
   c. introducing the mixture into a gas-liquid separation zone,
   d. recovering the noncondensable gases substantially free of hydrogen sulfide from the separation zone, and
   e. introducing the recovered noncondensable gases into the brine process to reduce its scaling potential.

9. The process of claim 8 wherein the oxidizing agent contains at least one

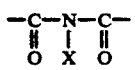

group.

10. The process of claim 8 wherein the oxidizing agent contains at least one

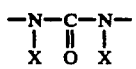

group.

11. The process of claim 8 wherein the oxidizing agent contains at least one

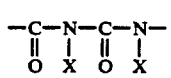

group.

12. The process of claim 11 wherein the oxidizing agent consists of elements selected from the group consisting of nitrogen, hydrogen, carbon, oxygen, bromine and chlorine.

13. The process of claim 12 wherein the pH is maintained at from 7 to 8.

14. The process of claim 13 wherein the volume ratio of condensate to noncondensable gas is at least 5:1.

15. The process of claim 8 wherein said oxidizing agent has the general formula:

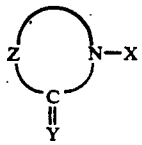

wherein X is a halogen, Y is oxygen or sulfur and Z is a divalent radical of from 3 to about 8 atoms in length.

16. A process for producing a substantially pure carbon dioxide gas stream from noncondensable gases produced during processing of a geothermal brine, during which processing there also is produced a condensate of steam derived from the geothermal brine, said noncondensable gas comprising carbon dioxide, water vapor and a minor amount of hydrogen sulfide, said process comprising:
   a. introducing the noncondensable gases into the condensate of steam in the presence of an oxidizing agent to form a mixture,
   b. maintaining the mixture at a pH within the range from about 7 to 8 under superatmospheric pressure for a time sufficient to oxidize in excess of 95 percent of the hydrogen sulfide,
   c. introducing the mixture into a gas-liquid separation zone, and
   d. withdrawing from the gas-liquid separation zone a gas stream substantially free of hydrogen sulfide and comprising a major amount of carbon dioxide and a minor amount of water vapor.

17. The process of claim 16 wherein said condensate is derived from a Salton Sea geothermal brine and said oxidizing agent has the general formula:

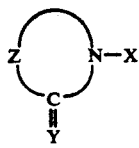

wherein X is a halogen, Y is oxygen or sulfur and Z is a divalent radical of from 3 to about 8 atoms in length.

18. The process of claim 17 wherein the oxidizing agent comprises a ring structure consisting of alternate carbon and nitrogen atoms 19. The process of claim 18 wherein Z is 3 to 4 atoms in length.

20. The process of claim 19 wherein the volume ratio of condensate to noncondensable gas is in excess of about 10:1.

21. The process of claim 11 wherein the pH is maintained within the range of about 7 to 8.

22. The process of claim 21 wherein the time is from two to sixty seconds.

23. The process of claim 22 wherein the gas withdrawn in step (d) is recycled to the geothermal brine to reduce the pH thereof.

* * * * *